(12) United States Patent
Smith et al.

(10) Patent No.: US 12,528,415 B2
(45) Date of Patent: Jan. 20, 2026

(54) ADAPTABLE STORAGE

(71) Applicant: JAGUAR LAND ROVER LIMITED, Coventry (GB)

(72) Inventors: Simon Smith, Banbury (GB); David Ovens, Southam (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 571 days.

(21) Appl. No.: 15/549,092

(22) PCT Filed: Feb. 5, 2016

(86) PCT No.: PCT/EP2016/052467
§ 371 (c)(1),
(2) Date: Aug. 4, 2017

(87) PCT Pub. No.: WO2016/124727
PCT Pub. Date: Aug. 11, 2016

(65) Prior Publication Data
US 2018/0037167 A1 Feb. 8, 2018

(30) Foreign Application Priority Data

Feb. 5, 2015 (GB) ..................................... 1501896
Feb. 5, 2015 (GB) ..................................... 1501898

(51) Int. Cl.
*B60R 5/04* (2006.01)
*B60R 9/06* (2006.01)

(52) U.S. Cl.
CPC ................ *B60R 5/041* (2013.01); *B60R 9/06* (2013.01)

(58) Field of Classification Search
CPC ... B60R 5/041; B60R 9/06; B60R 5/04; B60J 5/103; B60J 5/104; B60J 5/102;
(Continued)

(56) References Cited

U.S. PATENT DOCUMENTS 5,287,579 A * 2/1994 Estevez, Jr. ............. B60P 1/435
14/71.1
6,568,733 B1 5/2003 Lacy
(Continued)

FOREIGN PATENT DOCUMENTS

DE        10317539 A1    11/2004
DE     102004003405 A1 *  8/2005  .............. B60J 5/101
(Continued)

OTHER PUBLICATIONS

FR 2909319 A1 Translation, Guillez, Jun. 2008 (Year: 2008).*
(Continued)

*Primary Examiner* — Nathan J Newhouse
*Assistant Examiner* — Matthew T Theis
(74) *Attorney, Agent, or Firm* — TROUTMAN PEPPER LOCKE LLP; Dustin B. Weeks; Nicholas H. Doss

(57) ABSTRACT

An adaptable load floor assembly, storage compartment, and associated control system for a vehicle. The vehicle includes a storage compartment with a load floor, a rear opening, a door for selectively closing the opening, and a platform hinged to the load floor and located within the storage compartment when the door is closed. In use and when the door is open, the platform is pivotable from a retracted position in which the platform partially obstructs the opening and a deployed position in which the platform extends out of the opening to provide an extension to the load floor. The platform is operated automatically by an actuator and the free end of the platform is supported by a tether. The vehicle includes a control unit for controlling the movement of the platform in accordance with safety criteria to avoid damage.

20 Claims, 9 Drawing Sheets

(58) Field of Classification Search
CPC ...... B60N 2/36; B62D 33/03; B62D 33/0273; B62D 33/027; B60P 7/0892; B60P 1/003
USPC ........................................... 224/526
See application file for complete search history.

(56) References Cited

U.S. PATENT DOCUMENTS

| | | | | |
|---|---|---|---|---|
| 6,779,824 | B1 * | 8/2004 | Lazarevich | B60P 1/003 296/37.6 |
| 6,921,492 | B2 * | 7/2005 | De Gaillard | B60P 3/40 296/26.07 |
| 7,621,587 | B1 | 11/2009 | Hanser et al. | |
| 8,926,254 | B2 * | 1/2015 | Pocobello | A61G 3/061 414/537 |
| 2003/0044266 | A1 * | 3/2003 | Vandillen | A61G 3/061 414/537 |
| 2007/0057525 | A1 * | 3/2007 | Yui | B60J 5/103 296/55 |
| 2009/0212585 | A1 | 8/2009 | Leroy et al. | |
| 2012/0104786 | A1 | 5/2012 | Wimberley | |
| 2014/0248109 | A1 * | 9/2014 | Johnson | B60P 1/433 414/537 |
| 2014/0298726 | A1 | 10/2014 | Hemphill | |
| 2014/0356116 | A1 * | 12/2014 | Hermanson | B60P 1/433 414/519 |

FOREIGN PATENT DOCUMENTS

| | | | | |
|---|---|---|---|---|
| DE | 102004003405TRAN | * | 8/2005 | ............. B60J 5/101 |
| DE | 102005011679 A1 | | 9/2006 | |
| DE | 102008030886 A1 | | 12/2009 | |
| DE | 102009050678 A1 | | 4/2011 | |
| FR | 2909319 A1 | * | 6/2008 | ............. B60J 5/101 |
| GB | 2514888 A | | 12/2014 | |

OTHER PUBLICATIONS

Combined Search and Examination Report for application No. GB1501898.9, dated Jul. 30, 2015, 7 pages.
International Search Report for International application No. PCT/EP2016/052467, dated May 6, 2016, 6 pages.
Written Opinion for International application No. PCT/EP2016/052467, dated May 6, 2016, 5 pages.
Chinese Office Action with English machine translation corresponding to Chinese Application No. 201680008652.7, dated Apr. 27, 2020, 19 pages.
Chinese Office Action with English Translation corresponding to Chinese Application No. 201680008652.7, dated Oct. 9, 2022, 18 pages.
Office Action received in related Japanese Patent Application No. JP202310284444.1, mailed Oct. 31, 2025 (with machine translation) (17 pages).

* cited by examiner

ADAPTABLE STORAGE

TECHNICAL FIELD

The present disclosure relates to adaptable storage for vehicles and particularly, but not exclusively, to an adaptable storage compartment for vehicles. Aspects of the invention relate to an adaptable storage compartment for vehicles which is operable to partially obstruct the rear opening of a vehicle and an adaptable storage compartment for vehicles with an adaptable base. Aspects of the invention relate to a load floor assembly, to a storage compartment, to a vehicle and to a controller.

BACKGROUND

It is known to provide vehicles with two-part rear doors, which is also known as a split tailgate. A two-part rear door is normally split horizontally at a convenient vertical position of the door, for example at or just below the intersection between the rear windscreen and solid section.

The main purpose of a split tailgate is to facilitate opening of the rear door, for example where the rear door would otherwise be large and cumbersome. Split tailgates also enable easy access to the rear of the vehicle, for example by enabling the upper portion of the door to be opened while leaving the lower portion of the door in place. This can be useful, for example where loose items are on the load floor of the vehicle adjacent the rear door and would otherwise fall out of the vehicle if the door was opened entirely. Opening the lower portion of the door provides full access to the rear of the vehicle, aids loading of large items by acting as an extended load floor and can also be used as a seat when the vehicle is parked.

Developments in vehicle design, for example component and assembly weight reduction and power-assisted opening of rear doors, have resulted in a move towards more single-piece tailgates or doors, particularly given their reduced parts complexity as compared to split tailgates. However, it would be desirable to retain the secondary benefits of split tailgates with the use of single-piece doors.

It is a non-exclusive aim of the present invention to provide an arrangement that offers at least some of the benefits of split tailgates for use in vehicles having a single-piece rear door.

SUMMARY OF THE INVENTION

Aspects of the present invention relate to a load floor assembly, to a storage compartment, to a vehicle and to a controller as claimed in the appended claims. Other aspects relate to methods of operating or reconfiguring the load floor and to modules, controllers, apparatus and systems for controlling the load floor assembly or storage compartment or vehicle and to computer program elements for executing such methods. Other aspects relate to methods of operating or reconfiguring an adaptable load floor and to modules, controllers, apparatus and systems for controlling such a load floor assembly or storage compartment or vehicle and to computer program elements for executing such methods. For the avoidance of doubt, any of the features described herein apply equally to any aspect of the invention, unless they are incompatible therewith.

According to an aspect of the invention, there is provided a load floor assembly for a vehicle storage compartment, the assembly comprising a load floor, which is adapted to be mounted to a vehicle inboard of a rear door of the vehicle, and a platform movably mounted with respect to the load floor, wherein the platform is movable between a deployed position or condition and a retracted or upright position or condition, wherein: in the deployed position, the platform extends horizontally from an outer edge of the load floor and provides an extension thereto, the load floor and the platform forming a planar surface; and in the retracted or upright position or condition, in which the platform extends, in use, upwardly from the load floor within said storage compartment such that a rear door of the vehicle is able to close the storage compartment with the platform therein.

The provision of a deployable platform that is inside the storage compartment when the door is closed enables modern vehicles with a single piece tailgate to benefit from the advantages of split tailgate designs without at least some of the drawbacks. As used hereinafter, the term 'position' when referring to the deployed and/or retracted or upright (or other) positions should be interpreted to refer to a position or a condition.

According to another aspect of the invention, there is provided a load floor assembly for a vehicle storage compartment, the assembly comprising a load floor and a platform movably mounted with respect to the load floor, wherein the platform is movable between a deployed position and a retracted or upright position, wherein: in the deployed position, the platform extends horizontally from an outer edge of the load floor and/or provides an extension to the load floor, the platform and load floor together forming a planar surface; and in the retracted or upright position the platform extends orthogonally or upwardly, in use, with respect to the load floor.

The assembly or a vehicle within which the assembly is comprised, in use, may include a lip. The lip may extend, e.g. in use, from the outer edge of the load floor. In the retracted position, the platform may extend, in use, upwardly from the load floor inboard of the lip. The platform may be pivotally mounted with respect to the load floor inboard of the lip. The assembly may be configured such that when the platform is in the retracted or upright position a door of a vehicle within which the assembly is comprised, in use, is able to close against the lip or outer edge. In embodiments, the lip extends from an outer edge of the load floor and the door is able to close, in use, against the lip. The lip may be parallel or extend upwardly or downwardly or at an angle from the outer edge of the load floor. The lip may abut or be adjacent to or spaced from the outer edge of the load floor. The lip may abut or be adjacent to a lower edge of the platform when the platform is in the retracted or upright position. The lip may be fixed with respect to the load floor. Alternatively, the lip may be mounted or secured or fixed to the platform, for example an outer or rearward and/or lower portion thereof.

According to another aspect of the invention, there is provided a storage compartment for a vehicle, which storage compartment may comprise a load floor assembly as described above.

According to yet another aspect of the invention, there is provided a storage compartment for a vehicle, the storage compartment comprising a load floor, a rear opening and a platform movably mounted with respect to the load floor, wherein the platform is movable between a retracted position and a deployed position, wherein: in the retracted position the platform is inboard of the opening and at least partially obstructs the opening; and in the deployed position the platform extends horizontally out of the opening, the platform and load floor forming a planar surface.

According to another aspect of the invention, there is provided a vehicle, which vehicle may comprise a storage compartment as described above or a load floor assembly as described above.

According to yet another aspect of the invention, there is provided a vehicle comprising a storage compartment with a load floor, a rear opening, a door for selectively closing the opening and a platform movably mounted with respect to the load floor and located within the storage compartment when the door is closed, wherein when the door is open the platform is movable between a retracted position and a deployed position, wherein: in the retracted position the platform at least partially obstructs the opening; and in the deployed position the platform extends horizontally out of the opening, the load floor and the platform forming a planar surface.

In the deployed position, the platform may provide an extension to the load floor and/or closure of the door may be obstructed or otherwise prevented. The vehicle or storage compartment may comprise the or a lip. The door may have an inner surface and an outer surface and the storage compartment may be defined in part by the inner surface of the door. The platform may be located inboard of the inner surface of the door and/or may be movable with respect to the load floor separately or independently of the door.

The opening may be at least partially defined by the outer edge or by the lip. The door may be configured to contact, abut or lie adjacent to the load floor or load floor assembly (or outer edge or lip thereof) when in a closed position, for example to close the opening. The door and the platform may lie next, adjacent to, beside, against or abut one another and may extend substantially parallel to one another when the door is in the closed position. The platform may at least partially coextend the rear door on the inner side thereof, i.e. within the storage compartment, for example when the platform is in the retracted position and the rear door is closed.

The platform may be pivotally mounted or hinged with respect to the load floor, for example inboard of the outer edge or lip. In embodiments, a first end or edge of the platform, for example a longitudinal edge thereof, is pivotally mounted or hinged to the load floor.

In embodiments, a second end or edge of the platform, for example the other longitudinal edge thereof, may be connected to and/or supported, in use, by a tether. The platform may be supported by the tether in the deployed position. The tether may be connected to the platform at an intermediate position of the platform, for example between its ends or edges or at or adjacent a central portion of the platform. The intermediate position may be adjacent or toward the second end or edge of the platform.

The tether may be connected at a first of its ends to the platform, for example at or adjacent a free end thereof. The tether may be connected or connectable at a second end to the vehicle or storage compartment or to a connection that is fixed with respect to the load floor. The connection may be comprised in an upright of the load floor assembly or storage compartment or vehicle.

The tether may be flexible or semi-flexible and/or may comprise a cable or cable stay or any other suitable line. Alternatively, the tether may be rigid or semi-rigid and/or may comprise a linkage or any other suitable form of attachment.

The tether may be configured to retract, for example when the platform moves from the deployed position toward the retracted position. In embodiments, there is provided a retraction means for the tether. The retraction means may comprise a mechanism with a reel that may be rotatable and may be biased to turn or rotate in a first direction, for example a retraction direction. The retraction means may be comprised in, mounted to, fixed to, or otherwise associated with one of the platform, vehicle, and storage compartment.

There may be provided an actuation means, which may include one or more actuators and/or lever arms, for moving the platform between the retracted and deployed positions. The actuation means may be operable manually and/or automatically (for example the actuator may be one of an electric, electro-mechanic, hydraulic, or pneumatic actuator). A lever arm (or linkage) may be connected to the platform and the vehicle at or adjacent the opening. In embodiments, the tether retraction means comprises the actuation means.

There may be provided a control system for controlling the actuation means and at least one device for receiving a user input such as a request to move the platform between the retracted and deployed positions. The control system may include one or more electronic controllers which may be configurable by a user to move the platform automatically from the retracted position to the deployed position when the door is opened and vice versa. The control system may prevent or inhibit closure of the door when the platform is in the deployed position and/or prevent movement of the platform under certain predefined conditions such as when the door is in a closed or partially closed position.

There may be provided a sensing means, which may comprise one or more sensors, to sense or measure one or more characteristics or conditions. In embodiments, the sensing means is configured to sense or measure one or more environmental characteristics or conditions indicative of one or more of: load on the platform, a current deployment state of the platform, and the presence of an obstruction that might interfere with the moving or operation of the platform. In embodiments, the control system is configured to prevent movement of the platform under certain conditions or circumstances, such as if a load or obstruction is detected by the sensing means.

There may be provided a manual override to allow an operator to move the platform manually. The manual override may be configured to disable the control system and/or the actuation means. Additionally or alternatively, the manual override may be configured or operable to decouple or disengage at least part of the actuation means from the platform and/or from the load floor. In embodiments, the manual override comprises a handle and/or lever that is actuated by pulling and/or pushing and/or rotation. In embodiments, the actuation means comprises a fluid powered actuator and the manual override is a fluid valve which is opened to enable manual movement of the platform.

The platform may be securable in the retracted position and/or in the deployed position, for example by a locking means or by a force applied by the actuation means or by the tether. In some embodiments, the actuation means may comprise the locking means. In other embodiments the locking means is separate from the actuation means. The locking means may comprise a mechanism that may include a locking pin or latch. The locking pin or latch may be comprised in, mounted to, or otherwise associated with, the platform or load floor. The locking mechanism may comprise a recess, depression, or aperture which the pin or latch may selectively engage. The recess, depression, or aperture may be comprised in or otherwise associated with the other of the platform and load floor.

According to another aspect of the invention, there is provided a control system for operating a load floor assembly or storage compartment or vehicle, e.g. as described above.

According to yet another aspect of the invention, there is provided a control system for operating an adaptable load floor for a vehicle storage compartment with a rear opening, wherein the control system is configured to:

receive an electrical signal indicative of an operator command to deploy a load space extension platform;

in dependence on receipt of said signal, detect that the rear load space door of a vehicle is at least partially open to at least partially expose a rear opening and a retracted or upright platform located within a storage compartment of the vehicle; and in dependence on to said detection, automatically moving said platform between a retracted or substantially upright position, e.g. in which the platform at least partially obstructs the opening, and a deployed position, e.g. in which the platform extends horizontally out of the opening and/or provides an extension to the load floor.

The control system may comprise a controller having at least one electronic processor having an electrical input for receiving the electrical signal indicative of an operator command to deploy a load space extension platform. The controller may comprise an electronic memory device electrically coupled to the electronic processor and having instructions stored therein. The processor may be configured to access the memory device and execute the instructions stored therein such that it is operable to: detect a user request to deploy the load space extension platform based on receipt of said electrical signal indicative of an operator command to deploy a load space extension platform, and, optionally, in dependence upon said detection, command an actuator to move, e.g. automatically move, said platform between the retracted or substantially upright position and the deployed position in which the platform extends out of the opening and/or provides an extension to the load floor.

In embodiments, the electronic processor may have an electrical input for receiving one or more signals, e.g. from the sensing means.

The one or more signals may have a value indicative of a state of opening of the load space door. The one or more signals may have a value indicative that the door has been opened, e.g. to a predetermined position. The electronic processor may be configured to access the memory device and execute the instructions stored therein such that it is operable to: detect that the rear load space door of a vehicle is at least partially open based on the value(s) indicative of a state of opening of the load space door; and in dependence upon said detection, command the platform to move between the retracted or substantially upright position and the deployed position in which the platform extends out of the opening.

The one or more signals may have a value indicative of a state of deployment of the platform. The processor may be configured to access the memory device and execute the instructions stored therein such that it is operable to: detect that the platform is deployed based on the value(s) indicative of a state of opening of the platform; and in dependence upon said detection, inhibit the automatic closure of the door when the platform is in the deployed position.

The control system may be configured to prevent movement of the platform when the door is in a closed or partially closed position.

The one or more signals may have a value indicative of a load on the platform. The processor may be configured to access the memory device and execute the instructions stored therein such that it is operable to: detect that there is a load on the platform based on the value(s) indicative of a load on the platform; and in dependence upon said detection, inhibit movement of the platform.

The electronic processor may be operable to access the memory device and execute the instructions stored therein such that it is operable to operate the movement of the platform as described hereinabove.

Further aspects of the invention provide one or more modules, controllers, apparatus and/or systems for controlling the load floor or storage compartment or vehicle, e.g. according to the above method, and/or to computer program elements for executing such methods.

According to an aspect of the invention, there is provided a load floor assembly for a vehicle storage compartment, the assembly comprising a first portion and a second portion movable or deployable with respect to the first portion between a stowed position or condition in which the first and second portions together provide, in use, a load floor or load floor surface within the storage compartment and a deployed position or condition in which the second portion extends from the first portion at an angle relative thereto.

The provision of a load floor with a second portion movable relative to a first portion between stowed and deployed positions enables modern vehicles with a single piece tailgate to benefit from the advantages of split tailgate designs without at least some of the drawbacks. As used hereinafter, the term 'position' when referring to stowed and/or deployed (or other) positions should be interpreted to refer to a position or a condition.

The load floor or load floor surface provided by the first and second portions may be provided or defined within a storage compartment, e.g. inboard of a rear opening thereof.

According to another aspect of the invention, there is provided a storage compartment for a vehicle, which storage compartment may comprise a load floor assembly as described above.

According to yet another aspect of the invention, there is provided a vehicle storage compartment comprising a first load floor portion and a second load floor portion movable or deployable with respect to the first load floor portion between a stowed position in which the first and second load floor portions together provide, in use, a load floor or load floor surface, e.g. within the storage compartment, and a deployed position in which the second portion extends from the first portion at an angle relative thereto.

The storage compartment may comprise a rear opening that may be defined at least in part by an outer edge or lip of the load floor.

According to another aspect of the invention, there is provided a vehicle, which vehicle may comprise a storage compartment as described above or a load floor assembly as described above.

According to a further aspect of the invention, there is provided a vehicle comprising a first load floor portion and a second load floor portion movable or deployable with respect to the first load floor portion between a stowed position in which the first and second load floor portions together provide, in use, a load floor or load floor surface, e.g. within the storage compartment, and a deployed position in which the second portion extends from the first portion at an angle relative thereto.

The vehicle may comprise a rear door for selectively closing an opening of the storage compartment, for example wherein the second portion is located within the storage compartment when the rear door is in the closed position and/or when the second portion is in one or each of the deployed position and the stowed position.

The first portion may comprise a recess within which the second portion is received or receivable, for example in the stowed position. The second portion may be lockable or securable in the deployed position and/or in the stowed position. The first portion may comprise a fixed portion and/or the second portion may comprise a movable portion. The load floor may provide or correspond, in use, to the base or floor of a vehicle storage compartment in which it is comprised.

The second portion may extend substantially orthogonally or at a right angle, e.g. an angle of substantially 90 degrees, relative to the first portion in the deployed position. The second portion may extend vertically or be upstanding in the deployed position. The second portion may be configured to obstruct, in use, an opening of the vehicle storage compartment in the deployed position. The second portion may be configured to obstruct, in use, the rear opening of the storage compartment in the deployed position.

The second portion may be movable between the stowed position and two or more deployed positions. The second portion may be lockable or securable in at least one of the deployed positions. The aforementioned deployed position may comprise a first deployed position. The second portion may be movable to a second deployed position. The second portion may extend, in use, out of the rear opening of the storage compartment, for example in the second deployed position. The second portion may provide an extension to the load floor of the vehicle storage compartment when the second portion extends out of said rear opening, for example in the second deployed position. The second portion may lie parallel or extend at a substantially straight angle, for example at an angle of substantially 180 degrees, relative to the first portion, e.g. when the second portion extends out of said rear opening when the second portion is in the second deployed position.

The assembly may comprise a tether, which may be connected to a free end or edge of the second portion, e.g. when the second portion extends out of said rear opening. The tether may be connectable to the storage compartment or to a vehicle within which the assembly is comprised in use. The tether may be connected at or adjacent a first end to the free end or edge of the second portion and/or may be connectable at or adjacent a second end to the storage compartment or vehicle. The tether may be flexible or semi-flexible and/or may comprise a cable or cable stay or any other suitable line. Alternatively, the tether may be rigid or semi-rigid and/or may comprise a linkage or any other suitable form of attachment.

The second portion may be connected, e.g. pivotally connected, at or adjacent an outer or rear edge of the first portion or load floor when in the second deployed position.

The second portion may be movable to a third deployed position. In the third deployed position, the second portion may separate, in use, the load floor of the vehicle storage compartment. It will be appreciated that in embodiments the second portion may be movable between the stowed position and only one deployed position, which may be any one of the first, second or third deployed position. Similarly, the second portion may be movable between the stowed position and only two deployed positions, one of which corresponds to the first position and a second of which corresponds to the third position. Similarly, the two deployed positions may comprise the first and second positions.

In the third deployed position, the second portion may be inboard, e.g. spaced inwardly from, an outer edge or lip of the first portion or load floor assembly. In the third deployed position, the second portion may extend substantially orthogonally relative to the first portion. The second portion may extend vertically or be upstanding in the third deployed position. The second portion may define, in use, at least part of a secondary or subsidiary compartment between the rear opening of the storage compartment and the second portion when in the third deployed position.

In embodiments, the assembly comprises a third portion, which may be connected to the second portion and/or movable relative thereto. The third portion may be positionable, configurable, lockable or securable in a stowed position, for example in which it lies against, in or contiguous with the second portion. The third portion may lie against a side thereof that is lowermost when the second portion is in the stowed position and/or uppermost when the second portion is in the second deployed position.

The third portion may be movable between the stowed position and a deployed position. In the deployed position, the third portion may extend substantially orthogonally relative to the second portion. The third portion may extend substantially horizontally when the second and third portions are both in their respective deployed positions. The third portion may be pivotable about approximately 90 degrees or 270 degrees from its stowed position to its deployed position. The third portion may extend, in use, toward and/or out of the rear opening of the storage compartment when the second and third portions are both in their respective deployed positions.

The third portion may be movable to the deployed position when the second portion is in its first or third deployed position. The third portion may extend horizontally when the second portion is in its first or third deployed position and the third portion is in its deployed position. The third portion may comprise a support surface, e.g. a horizontal support surface, for receiving thereon one or more items when the third portion is in its deployed position.

In embodiments, the second portion is pivotable, for example about an axis or a first axis, between the stowed position and the first or second deployed position. Additionally or alternatively, the second portion may be pivotable about a second axis between the stowed position and the third deployed position. The second axis may be different from the first axis. The second portion may be pivotally connected at or adjacent the outer edge or lip of the load floor assembly, for example by or about the first axis. The second portion may be pivotally connected at a position spaced inwardly from the outer edge or lip, for example by or about the second axis to the load floor assembly. At least one of the axes may be provided by a pair, e.g. a respective pair, of retractable pins each receivable within a respective recess or aperture.

In embodiments, one or more of the pins are comprised in or associated with the second portion and the recesses or apertures are comprised in or associated with one of the storage compartment, load floor assembly or first portion, or vice versa. The first axis may be comprised or located at or along a first edge, e.g. longitudinal edge, of the second portion. The first axis may be provided by one or a pair of pins or rod ends extending from one or both ends of the first edge. The second axis may be comprised or located at or along a second edge, e.g. longitudinal edge, of the second portion. The second axis may be provided by one or a pair of pins or rod ends extending from one or both ends of the second edge. The second portion may be lockable or securable in at least one of the deployed positions by one of the pairs of retractable pins being receivable, in use, within a further pair of recesses or apertures, which may be in the storage compartment.

In embodiments, there comprises one or more first pivot recesses or apertures for cooperating with a first pin or pair of pins to provide the first axis and one or more second pivot recesses or apertures for cooperating with a second pin or pair of pins to provide the second axis. Additionally or alternatively, there may comprise one or more locking recesses or apertures for cooperating with a pin or a pair of pins, for example the second pin or pair of pins, to lock the second portion in the first deployed position. There may comprise one or more locking recesses or apertures for cooperating with a further pin or pair of pins, for example the first pin or pair of pins, to lock the second portion in the third deployed position. It is further envisaged that this configuration may be reversed, e.g. wherein the recesses or apertures may be comprised in or associated with the second portion and the pins may be comprised in or associated with the load floor assembly or first portion or storage compartment or vehicle.

In embodiments, one or more of the pins or rod ends are retractable or movable between deployed and retracted positions, e.g. to allow pivoting about the axis or to selectively lock the second portion in one or more stowed and deployed positions.

The pin or pins may be biased, for example resiliently biased, toward one of the positions, e.g. toward the or a deployed position. The pin or pins may be biased by a spring. The second portion may comprise one or more actuators for moving one or more, for example each pair, of pins between its positions. The actuator may be configured to move the one or more pins from their deployed position to their retracted position. The actuator may be rotatably actuated.

The load floor may comprise a locking or securing means, which may be associated with or comprised in the one or more recesses or holes. The locking or securing means may comprise a lock, latch or catch that may be operable by an actuator or manually using a predetermined urging force applied to the second portion to engage or disengage the one or more pins with or within the recesses or holes. The second portion may be movable between the stowed position and two or more deployed positions and lockable or securable in at least one, e.g. each, deployed positions by a locking means or a respective locking means.

The second portion may comprise one or more of a frame, side members and a body or panel, e.g. a main body or panel. The body or panel may be movable or deployable relative to the frame or side members.

In embodiments, the third portion is pivotable, for example about an axis, between the stowed and deployed positions. The axis may be comprised or located at or along an edge, e.g. a longitudinal edge, of the third portion. The axis may be provided by one or more pins extending from one or both ends of the edge.

In embodiments, the assembly comprises a substitute floor, which may extend between the first and second portion, e.g. when the second portion is in a deployed position. The substitute floor may be located below or beneath the second portion, e.g. when the second portion is in the stowed position.

The substitute floor may be positionable in a stowed position, e.g. in which a surface or upper surface thereof is lower than or depressed in relation to the load floor or load floor surface. The substitute floor may be suitable for receiving one or more articles on the lowered surface or within a depression or recess defined thereby. Additionally or alternatively, the substitute floor may be deployable to a deployed position, for example from the stowed position. The substitute floor may be adjacent, extend from or be contiguous with the load floor or load floor surface in the deployed position. The substitute floor may bridge substantially a gap between the load floor or load floor surface and the second portion.

The rear opening may be at least partially defined by an outer or peripheral edge of the load floor. There may comprise a rear door for selectively closing the rear opening, for example wherein said second portion is located within the storage compartment when the rear door is in a closed position. The door may be movable between a closed position in which the door closes the rear opening, and an open position in which the door does not close the rear opening. The load floor or second portion may be located or positioned within the vehicle or storage compartment when the rear door is in the closed position. The second portion may extend across most or at least half of the width of the opening. The second portion may, for example, extend across at least three quarters or four fifths or nine tenths of the width of the opening.

In some embodiments, movement of the second and/or third portions of the load floor is automated or controlled or carried out using actuation means, such as one or more motors or actuators. Similarly, retraction of the pins or rod ends may be automated or controlled or carried out using actuation means, such as one or more motors or actuators.

There may be provided a control system for controlling the actuation means and at least one device for receiving a user input such as a request to move the second and/or third portions between their respective retracted and deployed positions. The control system may include one or more electronic controllers which may be operable by a user to move the second and/or third portions automatically when the door is opened. The control system may prevent or inhibit closure of the door when the second portion is in the second deployed position and/or prevent movement of the second portion to the second deployed position under certain predefined conditions such as when the door is in a closed or partially closed position.

There may be provided a sensing means, which may comprise one or more sensors, to sense or measure one or more characteristics or conditions. In embodiments, the sensing means is configured to sense or measure one or more environmental characteristics or conditions indicative of one or more of: load on the second and/or third portions, a current deployment state of the second and/or third portions, and the presence of an obstruction that might interfere with the moving or operation of the second and/or third portions. In embodiments, the control system is configured to prevent movement of the second and/or third portions under certain conditions or circumstances, such as if a load or obstruction is detected by the sensing means.

There may be provided a manual override to allow an operator to move the second and/or third portion manually. The manual override may be configured to disable the control system and/or the actuation means. Additionally or alternatively, the manual override may decouple or disengage at least part of the actuation means from at least one of the first, second, or third portions. In embodiments, the manual override comprises a handle or lever. In embodiments, the actuation means may comprise a fluid powered actuator and the manual override is a fluid valve which is opened to enable manual movement of the second and/or third portions.

The second and/or third portions may be securable in their retracted position and/or in their deployed position, for example by a force applied by the actuation means or by the tether. In some embodiments, the actuation means may comprise a locking means.

According to another aspect of the invention, there is provided a control system for operating a load floor assembly or storage compartment or vehicle, e.g. as described above.

According to a further aspect of the invention, there is provided a control system for operating the load space door of a vehicle, wherein the control system is configured to:

receive an electrical signal indicative of a state of deployment of a movable load floor portion;

detect that the movable load floor portion is deployed based on the value(s) indicative of a state of opening of the movable load floor portion; and in dependence upon said detection, inhibit the automatic closure of the door when the movable load floor portion is in the deployed position.

According to yet another aspect of the invention, there is provided a control system for operating an adaptable load floor for a vehicle storage compartment with a rear opening, wherein the control system is configured to:

receive an electrical signal indicative of an operator command to deploy a load space extension;

in dependence on receipt of said signal, detect that the rear load space door of a vehicle is at least partially open to at least partially expose a rear opening and a load floor located within a storage compartment of the vehicle; and in dependence on to said detection, automatically moving a movable portion of the load floor with respect to a fixed portion thereof between a stowed or substantially upright position, e.g. in which the movable portion at least partially obstructs the opening, and a deployed position in which the movable portion extends out of the opening and provides an extension to the load floor.

The control system may comprise a controller having at least one electronic processor and an electrical input for receiving one or more electrical signals. The controller may comprise an electronic memory device electrically coupled to the electronic processor and having instructions stored therein.

The one or more signals may have a value indicative of a state of deployment of the movable load floor portion. The processor may be configured to access the memory device and execute the instructions stored therein such that it is operable to: detect that the movable load floor portion is deployed based on the value(s) indicative of a state of opening of the movable load floor portion; and in dependence upon said detection, inhibit the automatic closure of the door when the movable load floor portion is in the deployed position.

The processor may be configured to access the memory device and execute the instructions stored therein such that it is operable to: detect a user request to deploy the load space extension based on receipt of said electrical signal indicative of an operator command to deploy a load space extension, and, optionally, in dependence upon said detection, command an actuator to move, e.g. automatically, the movable load floor portion between the stowed or substantially upright position and the deployed position in which the movable load floor portion extends out of the opening and provides an extension to the load floor.

The control system may be configured to receive one or more electrical signals. The one or more signals may have a value indicative of a state of opening of the load space door. The one or more signals may have a value indicative that the door has been opened, e.g. to a predetermined position. The electronic processor may be configured to access the memory device and execute the instructions stored therein such that it is operable to: detect that the rear load space door of a vehicle is at least partially open based on the value(s) indicative of a state of opening of the load space door; and in dependence upon said detection, command the movable load floor portion to move between the stowed or substantially upright position and the deployed position in which the movable load floor portion extends out of the opening and provides an extension to the load floor.

The control system or processor may be configured or operable to prevent or inhibit movement of the movable load floor portion when the door is in a closed or partially closed position.

The one or more signals may have a value indicative of a load on the movable load floor portion. The processor may be configured to access the memory device and execute the instructions stored therein such that it is operable to: detect that there is a load on the movable load floor portion based on the value(s) indicative of a load on the movable load floor portion; and in dependence upon said detection, inhibit movement of the movable load floor portion.

The electronic processor may be operable to access the memory device and execute the instructions stored therein such that it is operable to operate the movement of the movable load floor portion as described hereinabove.

According to another aspect of the invention, there is provided a method of operating an adaptable load floor for a vehicle storage compartment with a rear opening, e.g. a load floor as described above.

According to yet another aspect of the invention, there is provided a method of operating a load floor assembly, which method comprises moving or deploying a portion of the load floor from a stowed position in which the first and second portions together provide a load floor or load floor surface to a deployed position in which the second portion extends from the first portion at an angle relative thereto and in which the second portion obstructs the opening or separates the load floor of the vehicle storage compartment or provides an extension to the base or floor of the vehicle storage compartment.

According to another aspect of the invention, there is provided a load floor assembly substantially as described above.

According to another aspect of the invention, there is provided a vehicle storage compartment substantially as described above.

Further aspects of the invention provide one or more modules, controllers, apparatus and/or systems for controlling the load floor or storage compartment or vehicle, e.g. according to the above method, and/or to computer program elements for executing such methods.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
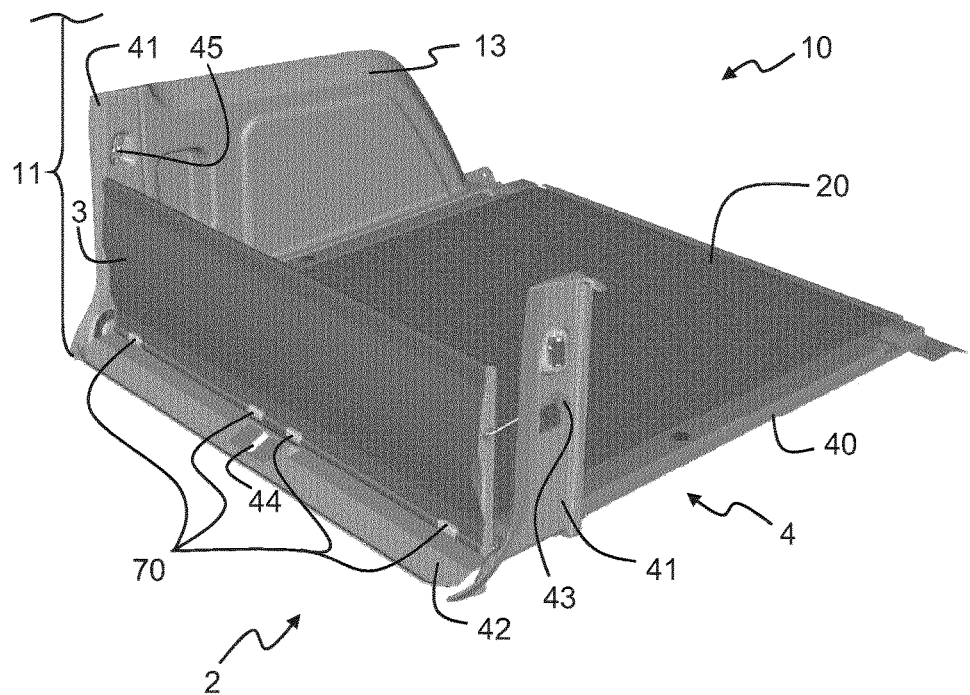
FIG. 1 shows a partial perspective view of the rear portion of a storage compartment of a vehicle according to an embodiment of the invention with the platform in a retracted position.
Figure 2:
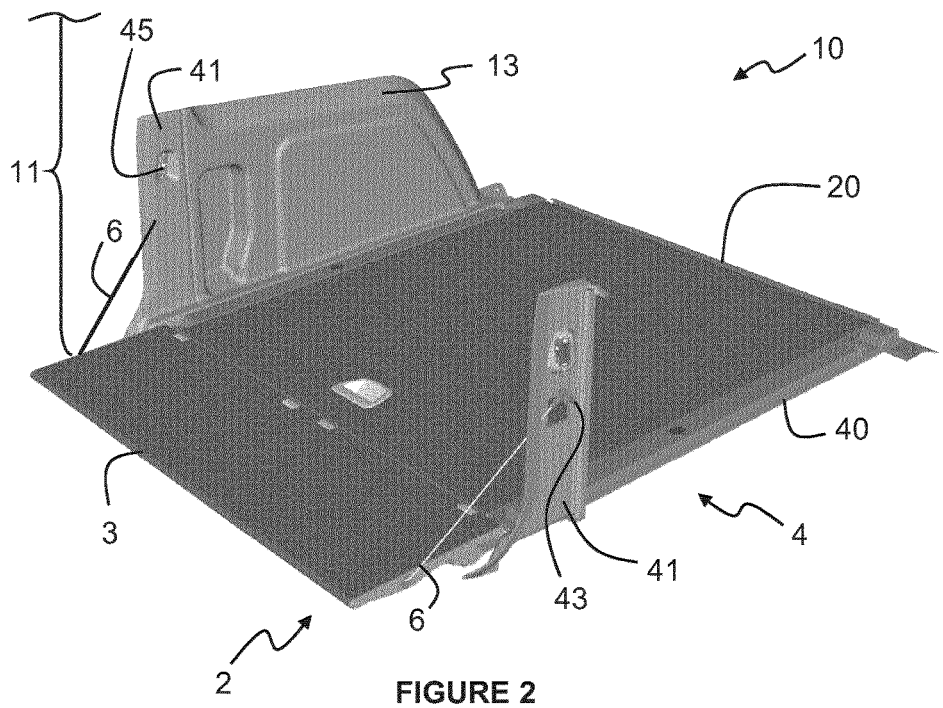
FIG. 2 shows a view similar to that of FIG. 1 with the platform in a deployed position.

A vehicle 1 in accordance with an embodiment of the present invention is described herein with reference to FIGS. 1 to 6.

The vehicle 1 includes a storage compartment 10, a rear opening 11 and a rear door 12 for selectively closing the opening 11. The rear door 12 includes an outer surface 12*a* and an inner surface 12*b* defining in part the storage compartment 10. The storage compartment 10 includes a load floor assembly 2 incorporating a load floor 20 and a platform 3 hinged to a frame 4 adjacent the outer end or edge of the load floor 20 and inboard of the opening 11. In this embodiment, the platform 3 is deployed and retracted by an actuation means in the form of an actuation mechanism 5. The platform 3 is movable between a retracted or upright position (shown in FIGS. 1 and 3), in which the platform 3 is vertical and obstructs part of the opening, and a deployed position (shown in FIGS. 2 and 4) in which the platform 3 extends horizontally out of the opening 11 and provides an extension to the load floor 20. In the deployed position, the load floor 20 and the platform 3 provide a substantially planar surface. This is advantageous for loading and unloading goods through, for example, sliding goods from/to the load floor 20 from/to the platform 3. The vehicle 1 also includes a tether or cable stay 6 for supporting the platform 3 when it is in the deployed position.

The storage compartment 10 is also defined by the load floor 20, opposed sides 13 and a roof (not shown). In this embodiment, the frame 4 includes a horizontal base support structure 40 on which the load floor 20 is secured and supported, a pair of opposed uprights 41. In this embodiment, the vehicle 1 includes a downwardly angled lip 42 that extends from a rear or outer edge of the load floor 20, when the load floor 20 is installed in the vehicle 1, and defines the lower edge of the opening 11. It is also envisaged that in other embodiments the lip 42 may form part of the frame 4. The base support structure 40 includes four semi-circular hinge blocks 70, one on either side of the center of the rear edge of the load floor 20 and one adjacent each outer end thereof. The hinge blocks 70 have substantially the same width, each including a central hole within which is received an elongate hinge rod 71.

The uprights 41 are adjacent the rear of the vehicle 1 and extend part way up each of the sides 13 of the vehicle 1. Each upright 41 includes an anchor point 43 secured to an intermediate portion thereof to which a first looped end of the tether 6 is pivotally connected. The door 12 is hinged along a horizontal axis to the top of the opening 11 and engages with a lock feature 44 accessible through a hole in the center of the lip 42. Each upright 41 also includes an input panel 45 with a pair of input buttons in this embodiment.

Figure 3:
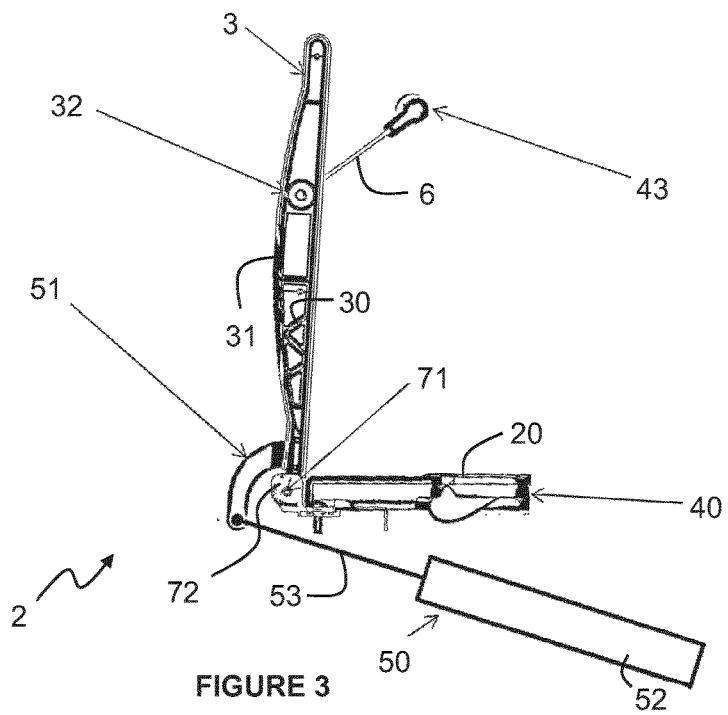
FIG. 3 shows a sectional schematic of part of the load floor assembly of the storage compartment of FIG. 1 with the platform in the retracted position.
Figure 4:
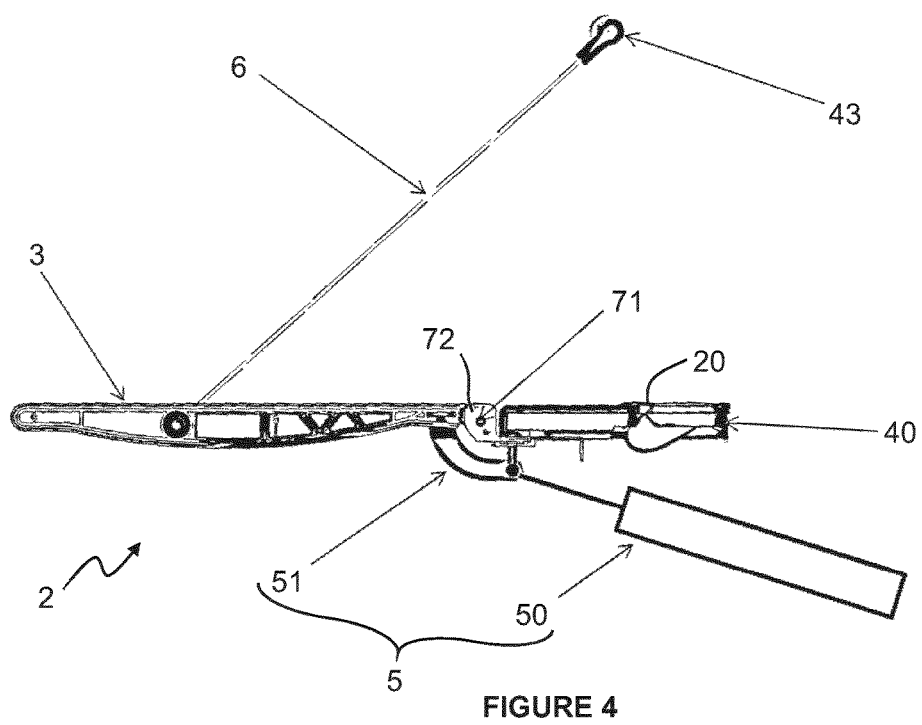
FIG. 4 shows a sectional schematic similar to that of FIG. 3 but with the platform shown in a deployed position.
Figure 5:
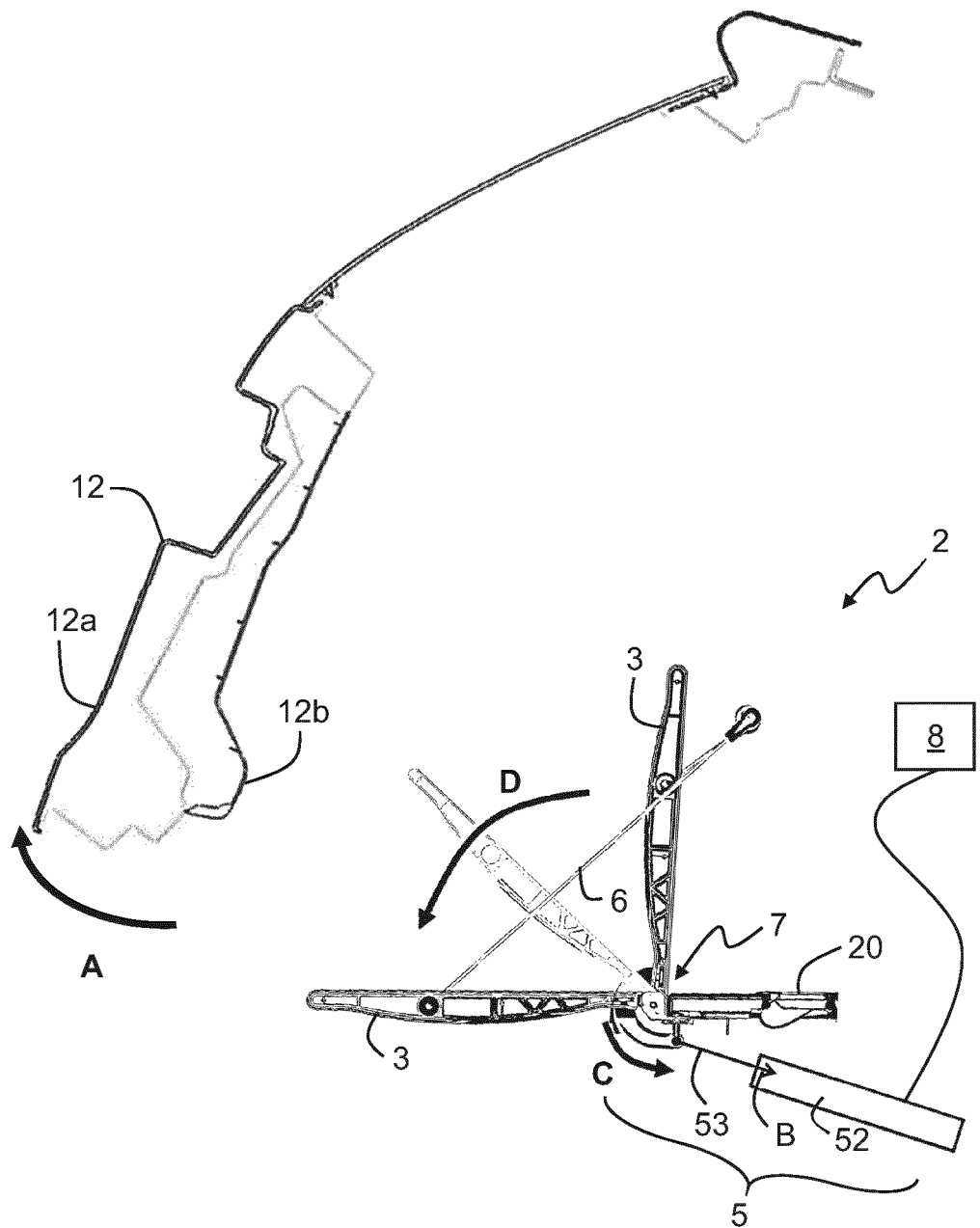
FIG. 5 shows a sectional schematic similar to that of FIG. 3 illustrating the movement of the load floor and an associated rear door of the vehicle.
Figure 6:
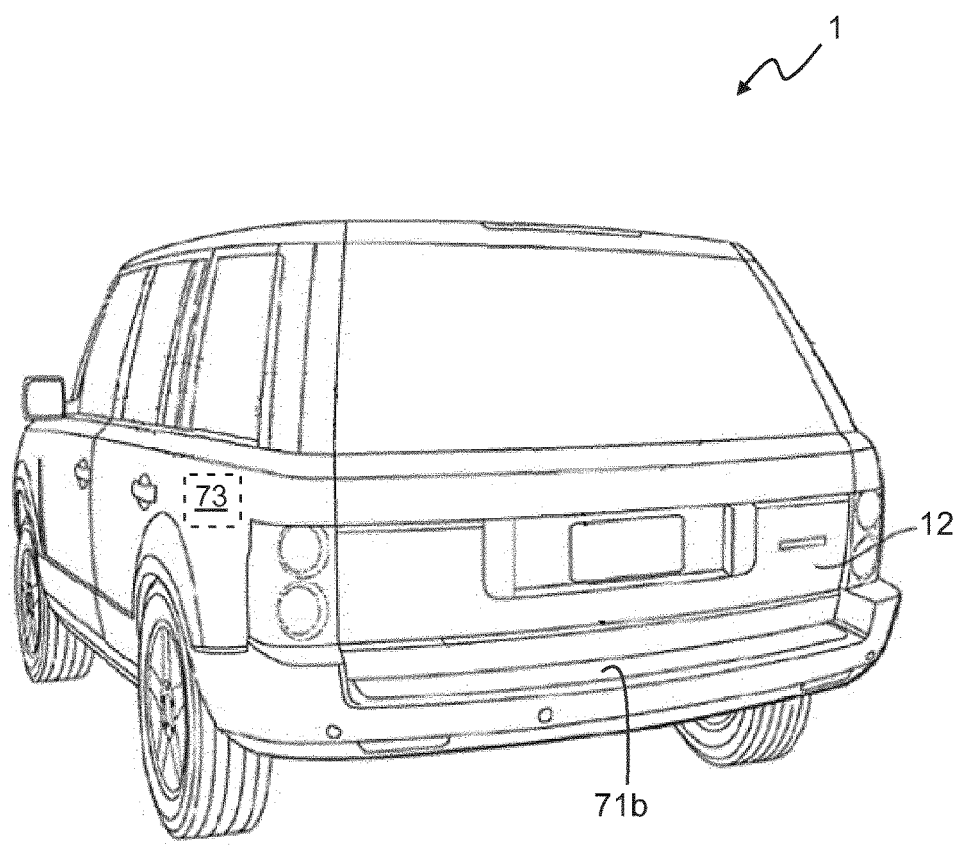
FIG. 6 shows a vehicle according to an embodiment of the invention.

As shown in FIGS. 3 to 5, the platform 3 is hollow with a ribbed internal support structure 30 over which is secured an outer skin 31. The support structure 30 includes five hinge blocks 72 at a lower edge thereof. The hinge blocks 72 of the support structure 30 are received between the hinge blocks 70 of the base structure 40 and include central holes that are aligned coaxially with those of the hinge blocks 70 of the base structure 40 with the hinge rod 71 extending therethrough. The three internal hinge blocks 72 of the support structure 30 also span the space between adjacent hinge blocks 70 of the base structure 40 with the two outer hinge blocks 72 being located on either side thereof such that together the hinge blocks 70, 72 and the rod 71 provide a substantially uninterrupted hinge 7.

The platform 3 also includes a retraction means in the form of a retraction mechanism 32 within an upper portion at each lateral side thereof. Each retraction mechanism 32 in this embodiment is in the form of a sprung reel that is biased to rotate in a clockwise direction as shown in the Figures. Each tether 6 is secured at its second end to the reel of the retraction mechanism 32 and is wound around the reel in the retracted or upright position shown in FIG. 3.

As shown more clearly in FIG. 5, the tether 6 unwinds against the spring bias of the reel of the retraction mechanism 32 as the platform 3 moves from the retracted position to the deployed position. In this embodiment, the tether 6 is unwound fully in the deployed position and is tensioned when a load is applied to the platform 3, thereby supporting the platform 3 in this configuration. It will be appreciated that the retraction mechanism 32 may be omitted or incorporated within or mounted to the uprights 41 instead of being included within the platform 3.

The actuation mechanism 5 includes an actuator 50 and a lever arm 51 connecting the actuator 50 to the platform 3. The lever arm 51 is substantially crescent shaped member with a first of its ends fixed to the internal support structure 30 of the platform 3 adjacent, but spaced upwardly from the hinge blocks 72 to provide a predetermined movement ratio and mechanical advantage. In this embodiment, the actuator 50 is an electromechanical linear actuator 50 that includes a cylinder 52 and a piston 53 that extends and retracts telescopically with respect to the cylinder 52. The free end of the cylinder 52 is pivotally mounted to the underside of the base support structure 40, while the free end of the piston 53 is pivotally mounted to a second, free end of the lever arm 51. It will be appreciated that several other actuation mechanisms 5 are envisaged without departing from the scope of the invention, for example the actuator may comprise a rotary actuator and/or may be connected directly to the platform or by a linkage with more than one element and/or may be powered hydraulically and/or pneumatically.

As depicted in FIG. 5, the vehicle 1 also includes a control means in the form of a control unit 8 operatively connected to the actuator 50 and to the input panel 45 for receiving commands therefrom. Deployment of the platform 3 is determined by virtue of the position of the actuator 50, but it is envisaged that the vehicle 1 may include a sensor for sensing independently the position of the platform 3. The actuator mechanism 5 also includes a load sensing means (not shown) incorporating a sensor (not shown) for sensing a load on the platform 3. In this embodiment the control unit 8 also receives signals from other vehicle control features or modules or units (not shown) to determine the state of various aspects of the vehicle 1, including for example the rear door position and the presence of obstructions adjacent the rear of the vehicle 1 detected by the rear parking sensors (not shown).

For purposes of this disclosure, and notwithstanding the above, it is to be understood that the controller(s), control units of control modules described herein may each comprise a control unit or computational device having one or more electronic processors. Vehicle 1 may comprise a single control unit or electronic controller or alternatively different functions of the vehicle control affected by the controller(s) may be embodied in, or hosted in, different control units or controllers or control modules. As used herein, the term "control unit" will be understood to include both a single control unit or controller and a plurality of control units or controllers collectively operating to provide the required control functionality. A set of instructions could be provided which, when executed, cause said controller(s) or control unit(s) or control module(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The control unit 8 is configured to ensure safe operation of the platform 3 between deployed and retracted positions. More specifically, the control unit 8 is configured to prevent movement of the door 12 and/or platform 3 under certain conditions or circumstances. For example, movement of the door 12 and platform 3 is prevented if an obstruction is detected in the area in which movement thereof might interfere with the obstruction. Similarly, movement of the platform 3 is prevented when in the deployed position and a load is detected. In addition, movement of the door 12 is prevented when the platform 3 is in the deployed position, and movement of the platform 3 is prevented when the door 12 is in a closed or partially closed position, to prevent damage.

In use and when the door 12 is in a closed condition, the platform 3 is in the retracted position of FIGS. 1 and 3, and is located within the storage compartment 10 of the vehicle 1, the door 12 is secured by a locking feature (not shown) thereof, which cooperates with the lock feature 44 of the vehicle 1. In this embodiment, the vehicle 1 enables either manual or automatic opening of the door 12. The door 12 is opened by disengaging the locking feature 44 either automatically using one or more actuators operated by the vehicle's onboard control system or manually by operation of a handle (not shown). The door 12 is then raised as shown by arrow A in FIG. 5, thereby exposing the rear opening 11.

With the door 12 in an open position, a user (not shown) is able to access the storage compartment 10 of the vehicle 1 through the partially obstructed opening 11 by reaching over the upright platform 3. As with a split tailgate, this can be useful where items located on the load floor of the vehicle adjacent the rear door are loose or have moved during transport and there is a risk that they might otherwise fall out of the vehicle if the door was opened entirely.

If unfettered access to the storage compartment 10 is required, the user (not shown) depresses one of the buttons on the input panel 45 which sends an electrical signal indicative of the users operation of the button to the control unit 8, which upon receipt thereof activates the actuator 50. The actuator 50 retracts the piston 53 into the cylinder 52 as depicted by arrow B, which pulls the lever arm 51 causing it to rotate as indicated by arrow C about the hinge 7, thereby moving the platform 3 from the upright position to the deployed position as indicated by arrow D. This extends fully the tether 6 such that any load placed on the platform 3 tensions the tether 6, thereby supporting the load and preventing or at least inhibiting any further movement of the platform 3. In the deployed position, the platform 3 aids loading of large items by acting as an extended load floor and can also be used as a convenient surface, for example as a social seat, a work surface or a table.

In this embodiment, a user is also able to configure the control unit 8 to deploy automatically the platform 3 on opening of the door 12. This is done via the onboard HMI (not shown) of the vehicle in this embodiment. The control unit 8 may be configured for such automatic deployment upon automatic and/or manual opening of the door 12. The circumstances under which the initiation of automatic deployment of the platform is allowed can also be configured. For example, the control unit 8 may be configured to initiate deployment of the platform 3 when the door 12 reaches a predetermined angle of opening and/or after a predetermined time period has elapsed. Further possible circumstances and characteristics relevant to safety and convenience are also envisaged within the scope of the invention and would be appreciated by those skilled in the art.

In addition, a user is also able to manually override the actuator 50 by depressing one of the buttons on the input panel 45. This disables the electromechanical linear actuator 50, thereby allowing the user to manipulate manually the platform 3 between the upright and deployed positions against the light spring biasing force of the retraction mechanism 32. In the event of an electrical fault with the control unit 8 or vehicle 1, the actuator 50 is also disabled automatically, which enables such manual operation.

It will be appreciated that various changes and modifications can be made to the present invention without departing from the scope of the present application.

An adaptable vehicle load floor 1 in accordance with an embodiment of the present invention is described herein with reference to FIGS. 7 to 22 and FIG. 6.

Figure 7:
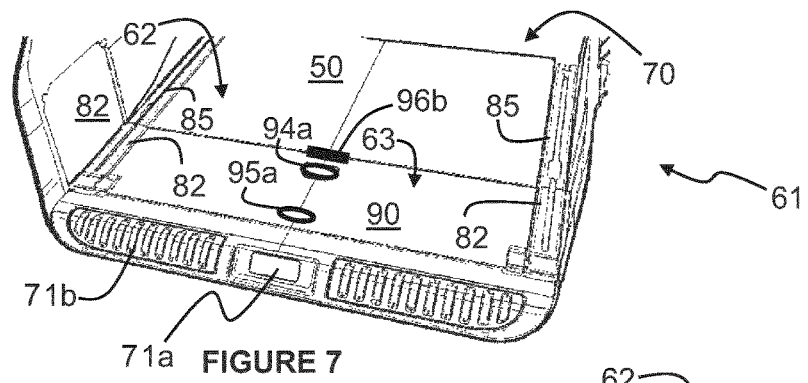
FIG. 7 shows a partial perspective view of the rear of a vehicle storage compartment according to an embodiment of the invention with the adaptable load floor in a stowed condition.
Figure 8:
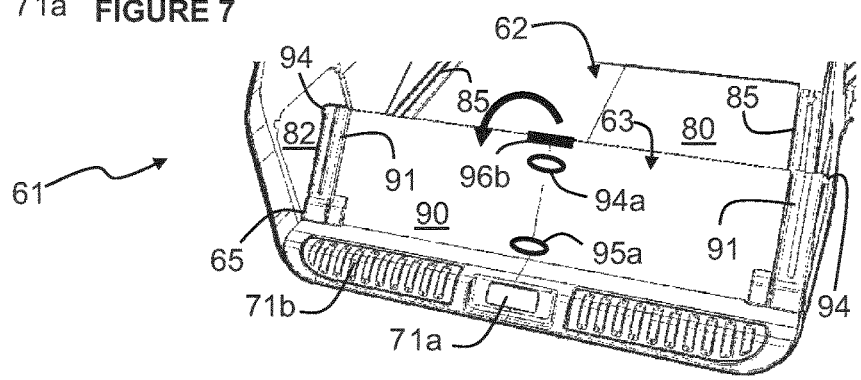
FIG. 8 shows a view similar to that of FIG. 7 with the second part of the load floor moving from the stowed condition towards a first deployed position.
Figure 9:
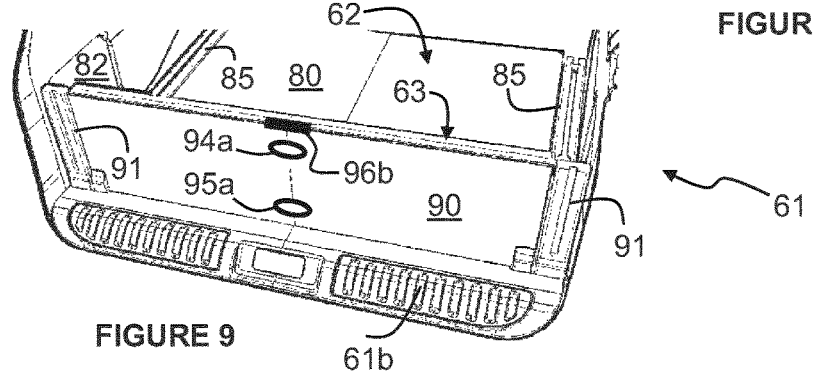
FIG. 9 shows a view similar to that of FIGS. 7 and 8 with the second part in the first deployed position.
Figure 10:
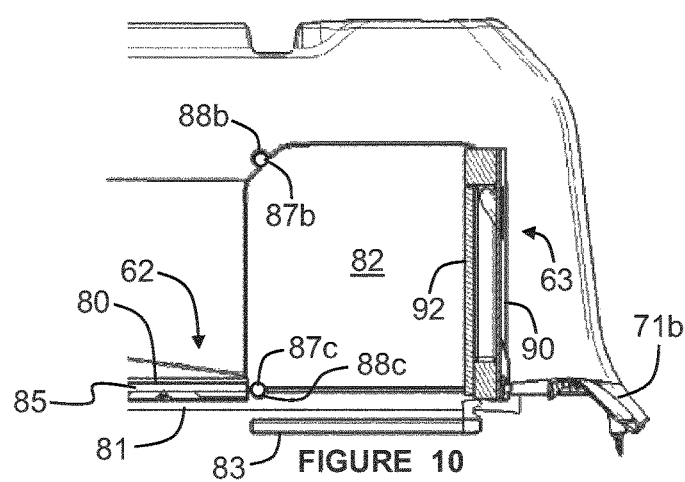
FIG. 10 is a side schematic view of the arrangement of FIG. 9.
Figure 11:
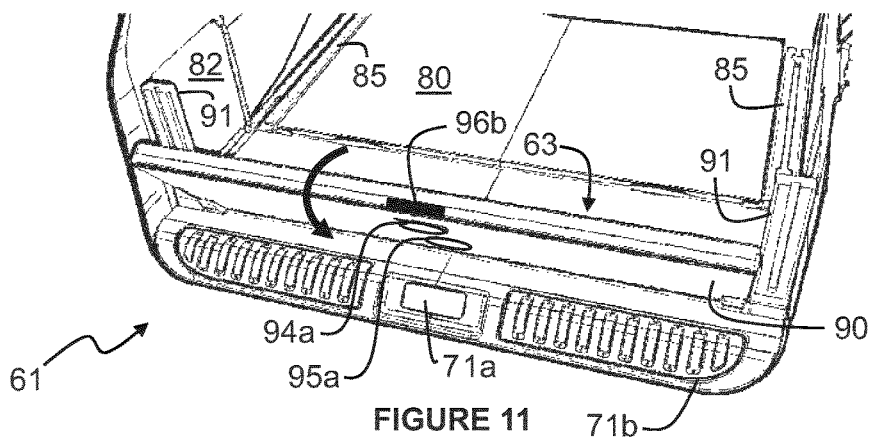
FIG. 11 shows a partial perspective view with the second part of the load floor moving from the first deployed position of FIG. 9 toward a second deployed position.
Figure 12:
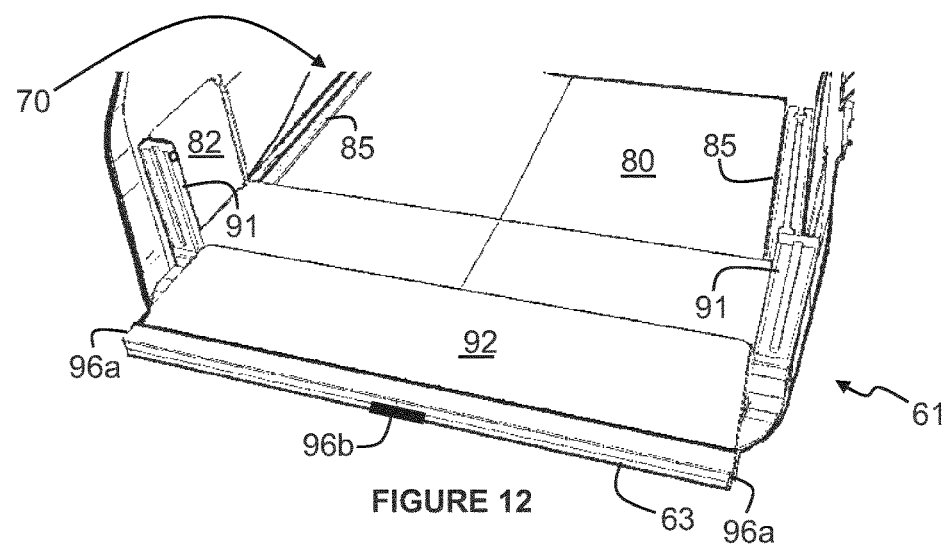
FIG. 12 shows a view similar to FIG. 11 with the second part in the second deployed position.
Figure 13:
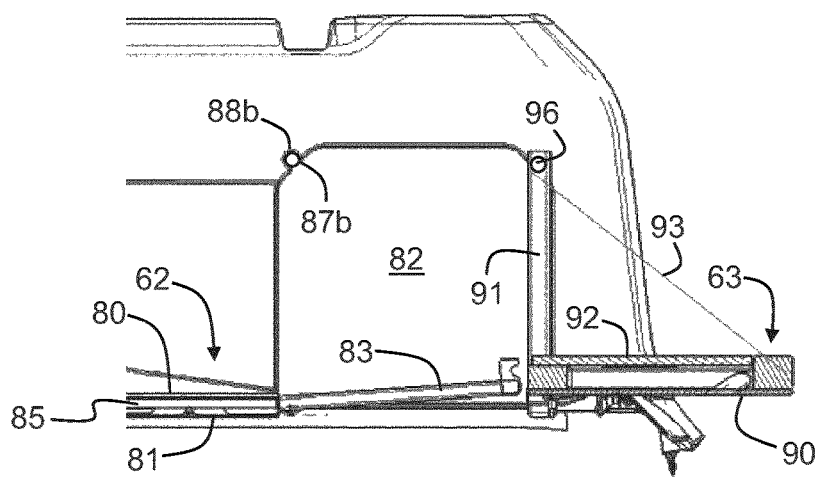
FIG. 13 is a side schematic view of the arrangement of FIG. 12.
Figure 14:
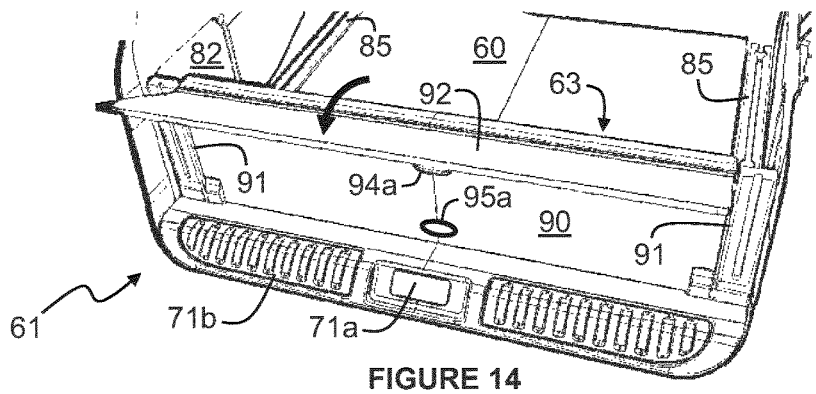
FIG. 14 shows a view similar to FIG. 9 with a third part of the load floor moving from a stowed condition toward a deployed position.
Figure 15:
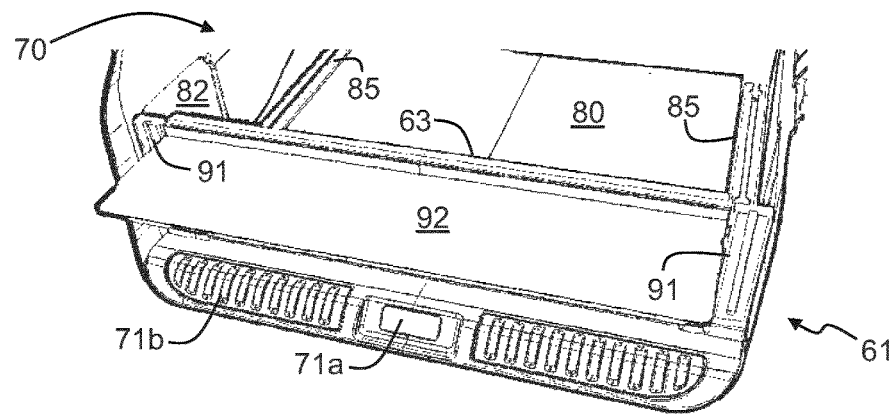
FIG. 15 shows a view similar to FIG. 14 with the third part in the deployed position.
Figure 16:
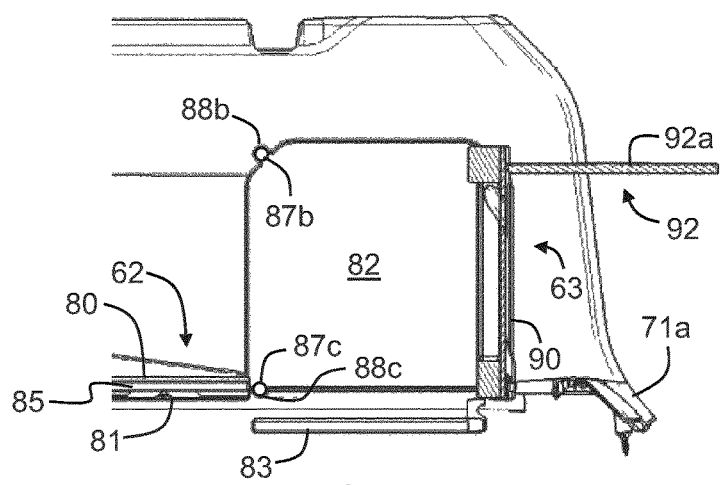
FIG. 16 is a side schematic view of the arrangement of FIG. 15.
Figure 17:
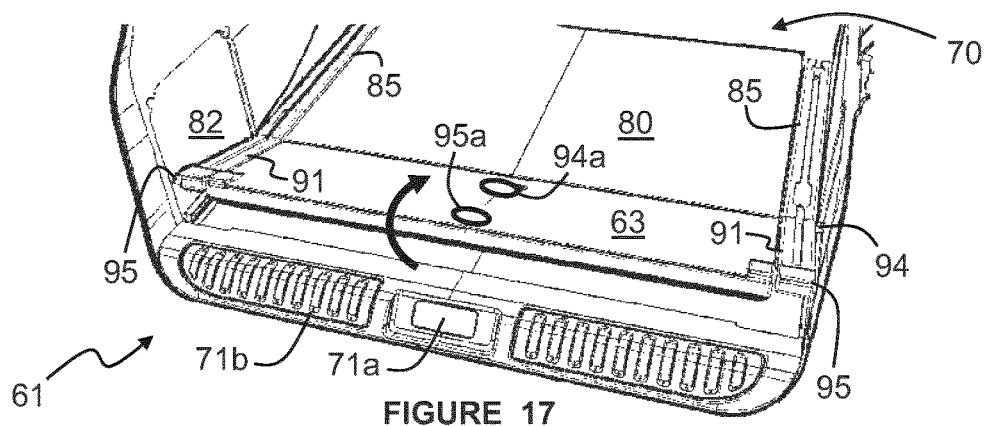
FIG. 17 shows a partial perspective view with the second part of the load floor moving from the stowed condition of FIG. 7 to a third deployed position.
Figure 18:
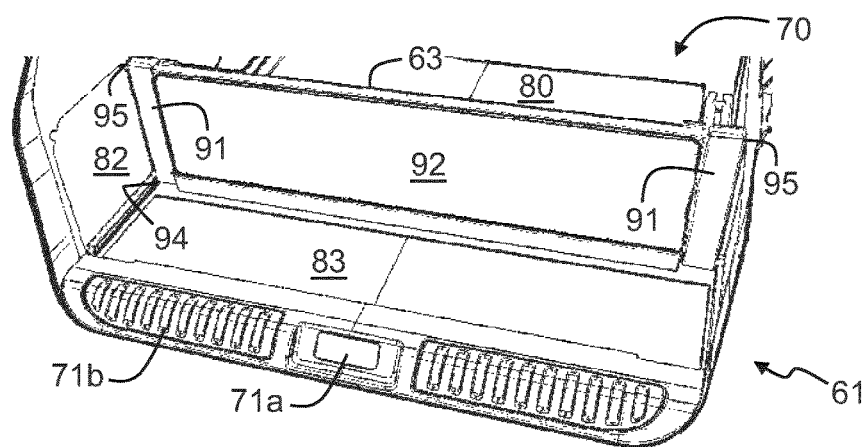
FIG. 18 shows a view similar to FIG. 17 with the second part in the third deployed position.
Figure 19:
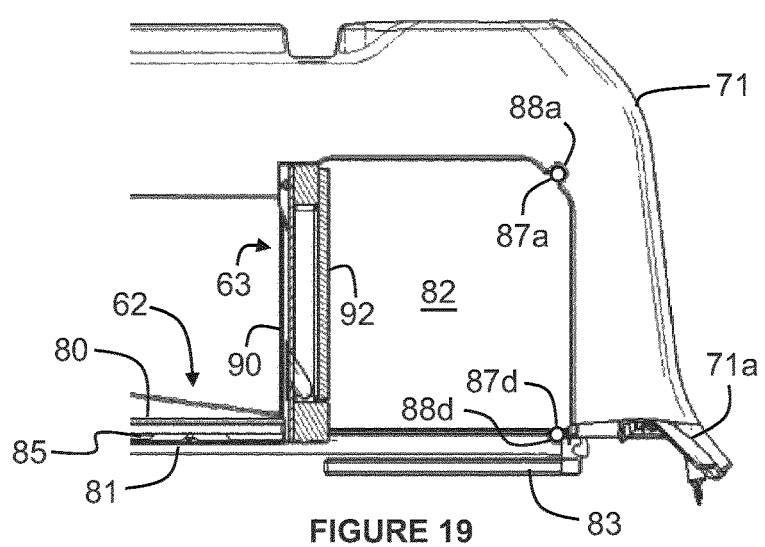
FIG. 19 is a side schematic view of the arrangement of FIG. 18.

As illustrated in FIGS. 7 to 22 and FIG. 6, an adaptable load floor assembly 61 is incorporated in a storage compartment 70 of a vehicle 1. The load floor assembly 61 includes a base 62 and a deployable section 63 that is reconfigurable between five different configurations including a stowed condition as shown in FIG. 7, a barrier configuration as shown in FIGS. 9 and 10, an extended load floor configuration as shown in FIGS. 12 and 13, a shelf configuration as shown in FIGS. 15 and 16 and a partition configuration as shown in FIGS. 18 and 19. The vehicle 1 includes a door 12 hinged along a horizontal axis to the top of the rear opening that engages with a lock feature 71a at the center of a lip 71b adjacent the end of the load floor assembly 61.

As shown more clearly in FIGS. 10 and 19, the base 62 includes a load surface 80, a base frame 81, a pair of upright side frames 82 and a substitute floor 83. The base frame 81 includes a pair of side rails 85. The load surface 80 is secured to and supported by the base frame 81 and extends between and lies contiguous with the side rails 85. Each side frame 82 includes a square-shaped recess with four locking holes 87a, 87b, 87c, 87d one at each of its corners. The upper corners of the recess of the side frame 82 are chamfered and each chamfered corner includes a semi-circular notch 88a, 88b concentric with a respective one of the upper locking holes 87a, 87b. The base frame 81 also includes a pair of semi-circular notches 88c, 88d concentric with a respective one of the lower locking holes 87c, 87d.

Figure 20:
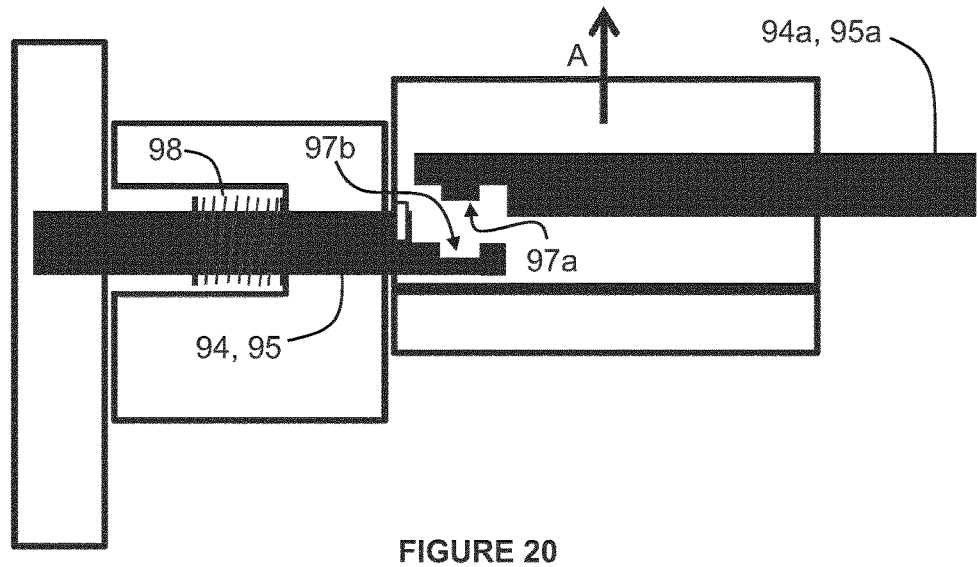
FIG. 20 is a schematic view of a releasable connection between a pivot pin actuator mechanisms and corresponding pivot pins.

The deployable section 63 includes a main body panel 90, a pair of side members 91, between which the main body panel 90 is mounted, and a secondary panel 92 pivotally attached to the upper edge of the main body panel 90. Each side member 91 includes a tether 93, first and second pivot pins 94, 95 both on an outer side adjacent the upper end thereof and a body panel locking pin hole 96 on an inner side adjacent the upper end thereof. The tether 93 is retractably mounted to an upper portion of a respective side member 91. Each pivot pin 94, 95 is retractable into the side member 91 and operable by a respective actuator mechanism 94a, 95a on the main body panel 90. As illustrated in FIG. 20, each of the pivot pin actuators mechanism 94a, 95a is releasably connected to a respective one of the pivot pin pairs 94, 95 by cooperating key features 97a, 97b in the actuator mechanism 94a, 95a and pins 94, 95 and each pivot pin pair 94, 95 is resiliently biased toward the deployed position by a compression spring 98.

The main body panel 90 is pivotally mounted between the side members 91 by a pair of lower pins (not shown) received within bearings (not shown) mounted to the lower end of the side members 91 with one end of each tether 93 secured to a respective upper end of the body panel 90. The upper end of the main body panel 90 also includes a pair of retractable locking pins 96a for cooperating with the locking pin holes 96 of the side members 91, thereby to secure the main body panel 90 to the side members 91 such that it extends between and contiguous with the side members 91. The main body panel 90 includes the first pivot pin actuator mechanism 94a, the second pivot pin actuator 95a and a locking pin actuator 96b. Operation of the body panel locking pin actuator 96b, which involves sliding it toward the right in this embodiment, both retracts the locking pins 96a and simultaneously disengages the actuator mechanisms 94a, 95a and pins 94, 95, as illustrated by the arrow A in FIG. 20.

Figure 21:
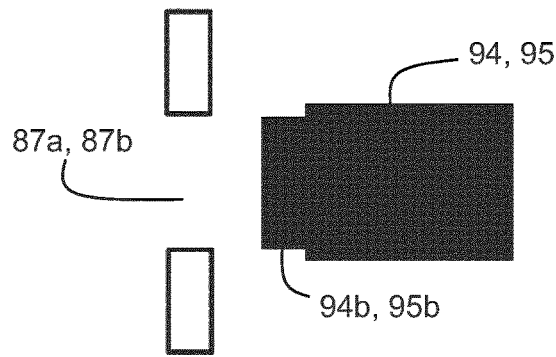
FIG. 21 is a schematic view of the releasable connection between the pivot pins and the upper locking holes of side frame.
Figure 22:
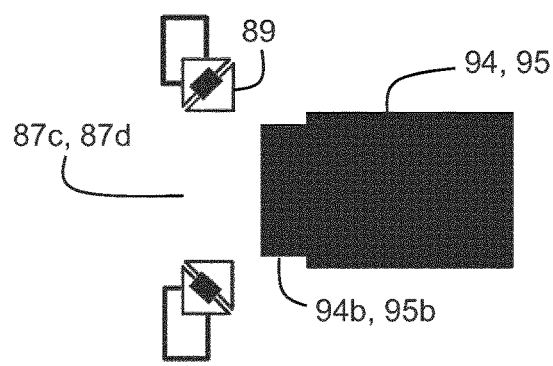
FIG. 22 is a schematic view of the releasable connection between the pivot pins and the lower locking holes of the side frame.

As illustrated in FIGS. 21 and 22, each pivot pin 94, 95 includes a stepped end providing a engagement portion 94b, 95b. As illustrated in FIG. 21, each of the upper locking holes 87a, 87b is sized to receive the engagement portion 94b, 95b of one of the pivot pins 94, 95. As illustrated in FIG. 22, each of the lower locking holes 87c, 87d includes a bearing 89 sized to receive the engagement portion 94b, 95b of one of the pivot pins 94, 95 to facilitate rotation of the pins 94, 95.

When the load floor assembly 61 is in the stowed condition, as shown in FIG. 7, the first pair of pivot pins 94 engage a first pair of the lower locking holes 87c and the second pair of pivot pins 95 engage the second pair of lower locking holes 87d.

In use and starting with the load floor assembly 61 in the stowed condition, a user grips and actuates the first pivot pin actuator mechanism 94a, which is done by clockwise rotation in this embodiment. Actuation of the first pivot pin actuator mechanism 94a causes the first pair of pivot pins 94 to retract from the first pair of lower locking holes 87c and into the main body panel 90 thus freeing the innermost edge of the deployable section 63. As illustrated by FIG. 8, the user then pulls the first pivot pin actuator mechanism 94a to lift the deployable section 63 into an upstanding orientation and rotates the actuator mechanism 94a back to its original orientation to release the first pivot pins 94, which then engage a first pair of the upper locking holes 87a to secure the deployable section 63 in the barrier configuration. In this position, the substitute floor is slightly lower than the load surface 80, thereby providing a depression in the load floor assembly 61. It is also envisaged that the first pivot pin actuator mechanism 94a could be spring loaded such that it returns automatically to the original orientation upon release.

The user may then reconfigure the load floor assembly 61 into the open configuration shown in FIGS. 12 and 13 by sliding the main body panel locking pin actuator 96b to the right and pulling it downwardly. As explained above, operation of the body panel locking pin actuator 96b retracts the locking pins 96a and disengages the actuator mechanisms 94a, 95a from the pins 94, 95, thereby allowing the main body panel 90 to pivot as shown in FIG. 11 from the barrier configuration to the extended load floor configuration, where it extends out of the rear opening of the vehicle 1 to aid loading of large items by acting as an extended load floor and/or to provide a support surface, e.g. a seat. As shown in FIG. 13, pivoting the main body panel 90 relative to the side members 91 also causes the substitute floor 83 to be raised into a position that substantially bridges the gap between the load surface 80 and the body panel 90, while the tethers 93 support the main body panel 90 in this position.

Alternatively, the user can reconfigure the load floor assembly 61 from the barrier configuration of FIGS. 9 and 10 to the shelf configuration shown in FIGS. 15 and 16. In this embodiment, the secondary panel 92 is held in place by a magnet latch (not shown), so the lower end of the secondary panel 92 must be pulled firmly to overcome the magnetic latch and the secondary panel 92 is then rotated relative to the main body panel 90 as shown in FIG. 14 to a horizontal orientation thereby to provide a horizontal support surface 92a. It is envisaged that the support surface 92a may be used to support one or more items, such as drinks or food and/or it may be used as a workspace or desk space in use.

In situations where a user wishes to separate the storage compartment, for example where a smaller load that is susceptible to movement during travel, the load floor assembly 61 may be reconfigured into the partition configuration shown in FIGS. 18 and 19. This is achieved starting with the load floor assembly 61 in the stowed condition of FIG. 7. The user grips and actuates by clockwise rotation the second pivot pin actuator 95a, which causes the second pair of pivot pins 95 to retract from the second pair of lower locking holes 87d and into the side members 91, thereby freeing the outermost edge of the deployable section 63. As illustrated by FIG. 17, the user then pulls the second pivot pin actuator 95a to lift the deployable section 63 into an upright orientation and rotates the actuator 95a back to its original orientation to release the second pivot pins 95, which then engage the second pair of the upper locking holes 87b to secure the deployable section 63 in the partition configuration. It is also envisaged that the second pivot pin actuator 95a could be spring loaded such that it returns automatically to the original orientation upon release.

As illustrated in FIG. 19, the substitute floor 83 remains in its lowered position such that the rear of the vehicle provides a small edge to inhibit a load received on the substitute floor 83 from falling out of the vehicle 1 when the rear door 12 is opened after a journey.

While operation of the load floor assembly is manual in this embodiment, it is envisioned that such operation may be automated and/or controlled by a control module 73 of the vehicle either in addition to or as an alternative to the manual actuation described above. In fact, it is considered by the applicants that it would be advantageous in some circumstances to provide one or a series of actuators that are operable automatically to selectively retract one or more of the pins 94, 95, 96a and/or to selectively disengage one or each of the actuator mechanisms 94a, 95a from the pins 94, 95. It will also be advantageous in some circumstances to provide one or a series of motors that are operable automatically to move the deployable section 63 between the various positions described above. In such circumstances, embodiments of the invention may include a control means or module or system and/or an associated program element or algorithm for executing such automatic operation. This operation may be controlled by a user and/or in some circumstances the automatic operation may be partially or entirely autonomous based on predetermined conditions.

The invention claimed is:

1. A load floor assembly for a vehicle having a storage compartment, the assembly comprising a load floor, mountable to the vehicle inboard of a rear door thereof, and which, in use, defines a horizontal floor of the storage compartment at least in part, and a platform movably mounted with respect to the load floor, wherein the platform is movable between a deployed position and a retracted position independently of the rear door of a vehicle within which the assembly is comprised, wherein:
   in the deployed position, the platform extends horizontally with respect to the vehicle from an outer edge of the horizontal load floor and provides an extension thereto, the horizontal load floor and the platform forming a common substantially planar surface, the common substantially planar surface configured to facilitate sliding an object from the load floor to the platform and from the platform to the load floor; and
   in the retracted position, the platform extends, in use, upwardly from the load floor within said storage compartment such that a rear door is able to close the storage compartment with the platform therein,
   wherein the load floor assembly is configured to support the platform in the deployed position in a manner that prevents downward movement of the platform away from the deployed position.

2. A load floor assembly according to claim 1 comprising a lip extending from the outer edge of the load floor, wherein in the retracted position the platform is pivotally mounted with respect to the load floor inboard of the lip such that the rear door of a vehicle within which the assembly is comprised is able to close against the lip.

3. A load floor assembly according to claim 1 comprising a tether connected at a first of its ends to the platform at or adjacent a free end thereof and connectable, in use, at a second of its ends to the vehicle within which the assembly is comprised.

4. A load floor assembly according to claim 3, wherein the tether is configured to retract when the platform moves from the deployed position toward the retracted position.

5. A load floor assembly according to claim 1 comprising an actuation mechanism for moving the platform between the retracted and deployed positions.

6. A load floor assembly according to claim 5, wherein the actuation mechanism is operable automatically.

7. A load floor assembly according to claim 5 comprising a control unit for controlling the actuation mechanism.

8. A load floor assembly according to claim 7 comprising a sensor for sensing a load on the platform when the platform is in the deployed position, wherein the control unit is configured to prevent movement of the platform if a load is detected by the sensor when the platform is in the deployed position.

9. A load floor assembly according to claim 5, wherein the actuation mechanism is selected from the group consisting of a manual actuation mechanism, an electromechanical actuation mechanism, an electrical actuation mechanism, a hydraulic actuation mechanism and a pneumatic actuation mechanism.

10. A load floor assembly according to claim 5, wherein the actuation mechanism comprises an actuator operatively connected to the platform by a lever arm.

11. A load floor assembly according to claim 5 comprising a manual override to allow an operator to move the platform manually.

12. A load floor assembly according to claim 1, wherein the platform is lockable or securable in the retracted position and/or in the deployed position.

13. A vehicle comprising a load floor assembly according to claim 1.

14. A vehicle according to claim 13, wherein the door comprises an outer surface and an inner surface defining in part the storage compartment, the platform being located inboard of the inner surface of the door.

15. A vehicle according to claim 13, wherein the platform at least partially coextends the rear door on the inner side thereof within the storage compartment when the platform is in the retracted position and the rear door is closed.

16. A vehicle comprising a storage compartment with a horizontal load floor, a rear opening, a door for selectively closing the opening and a platform movably mounted with respect to the load floor and located within the storage compartment when the door is closed, wherein when the door is open the platform is movable between a retracted position and a deployed position independently of the door, wherein:
   in the retracted position, the platform at least partially obstructs the opening; and
   in the deployed position the platform extends horizontally with respect to the vehicle out of the opening, the platform and horizontal load floor forming a common substantially planar surface, the common substantially planar surface configured to facilitate sliding an object from the load floor to the platform, and from the platform to the horizontal load floor,
   wherein the vehicle is configured to support the platform in the deployed position in a manner that prevents downward movement of the platform away from the deployed position.

17. A control system for operating an adaptable load floor for a vehicle storage compartment with a rear opening, wherein the load floor defines a horizontal load floor, and further wherein the control system is configured to:

receive an electrical signal indicative of an operator command to deploy a load space extension platform;
   in dependence on receipt of said signal, detect that the rear load space door of a vehicle is at least partially open to at least partially expose a rear opening and a retracted platform located within a storage compartment of the vehicle; and
   in dependence on said detection, automatically move said platform between a retracted position, in which the platform at least partially obstructs the opening, and a deployed position, in which the platform extends horizontally with respect to the vehicle out of the opening and provides an extension to the horizontal load floor and in which the platform is supported by the vehicle such that downward movement of the platform away from the deployed position is prevented.

18. A control system according to claim 17 comprising a controller having at least one electronic processor having an electrical input for receiving the electrical signal indicative of an operator command to deploy a load space extension platform and an electronic memory device electrically coupled to the electronic processor and having instructions stored therein, the processor being configured to access the memory device and execute the instructions stored therein such that it is operable to: detect a user request to deploy the load space extension platform based on receipt of said electrical signal indicative of an operator command to deploy a load space extension platform, and in dependence upon said detection, command an actuator to automatically move the platform between the retracted or substantially upright position and the deployed position in which the platform extends out of the opening and/or provides an extension to the load floor.

19. A control system according to claim 17 comprising an electronic processor and a memory device, wherein the electronic processor comprises an electrical input for receiving one or more signals having a value indicative of a state of opening of the load space door, the electronic processor being configured to access the memory device and execute instructions stored therein such that it is operable to: detect that the rear load space door of a vehicle is at least partially open based on the value(s) indicative of a state of opening of the load space door; and in dependence upon said detection, command the platform to move between the retracted or substantially upright position and the deployed position in which the platform extends out of the opening.

20. A control system according to claim 17 comprising an electronic processor and a memory device, wherein the electronic processor comprises an electrical input for receiving one or more signals having a value indicative of a state of deployment of the platform, the processor being configured to access the memory device and execute instructions stored therein such that it is operable to: detect that the platform is deployed based on the value(s) indicative of a state of opening of the platform; and in dependence upon said detection, inhibit the automatic closure of the door when the platform is in the deployed position.

* * * * *